(12) United States Patent
Bohr

(10) Patent No.: US 8,038,848 B2
(45) Date of Patent: Oct. 18, 2011

(54) RECYCLING OF TIRES, RUBBER AND OTHER ORGANIC MATERIAL THROUGH VAPOR DISTILLATION

(76) Inventor: Harvey Bohr, Bonnots Mill, MO (US)

( * ) Notice: Subject to any disclaimer, the term of this patent is extended or adjusted under 35 U.S.C. 154(b) by 828 days.

(21) Appl. No.: 12/077,795

(22) Filed: Mar. 21, 2008

(65) Prior Publication Data

US 2008/0230365 A1 Sep. 25, 2008

Related U.S. Application Data

(60) Provisional application No. 60/919,791, filed on Mar. 23, 2007.

(51) Int. Cl.
*C10B 1/00* (2006.01)
*B01D 3/00* (2006.01)

(52) U.S. Cl. ........ 202/105; 202/133; 202/117; 202/262; 422/610; 422/643; 422/307

(58) Field of Classification Search ............ 202/96, 202/97, 117, 133, 211, 237, 242, 262, 270, 202/105; 422/610, 643, 307
See application file for complete search history.

(56) References Cited

U.S. PATENT DOCUMENTS

| | | | |
|---|---|---|---|
| 4,050,991 A | 9/1977 | Kautz, Jr. | |
| 4,402,791 A | 9/1983 | Brewer | |
| 4,648,328 A | 3/1987 | Keough | |
| 5,198,018 A * | 3/1993 | Agarwal | 75/401 |
| 5,366,595 A * | 11/1994 | Padgett et al. | 201/19 |
| 5,449,438 A | 9/1995 | Jagau et al. | |
| 5,720,232 A | 2/1998 | Meador | |
| 5,783,046 A * | 7/1998 | Flanigan | 201/25 |
| 7,037,410 B2 * | 5/2006 | Flanigan | 202/81 |
| 7,329,329 B2 | 2/2008 | Masemore et al. | |
| 7,375,255 B2 * | 5/2008 | Lee | 585/241 |
| 7,416,641 B2 | 8/2008 | Denison | |
| 2006/0163053 A1 | 7/2006 | Ershag | |
| 2008/0017496 A1 * | 1/2008 | Thompson | 201/25 |
| 2008/0257709 A1 * | 10/2008 | Dimitrov et al. | 201/25 |
| 2009/0211892 A1 | 8/2009 | Cunningham et al. | |

FOREIGN PATENT DOCUMENTS

| | | | |
|---|---|---|---|
| EP | 0446930 B1 | | 3/1991 |
| EP | 0 851 019 B1 | | 12/1997 |
| EP | 1347238 | * | 9/2003 |
| GB | 2303859 | * | 3/1997 |
| GB | 2303859 | | 5/1997 |

* cited by examiner

*Primary Examiner* — Nina Bhat
(74) *Attorney, Agent, or Firm* — Mark Manley

(57) ABSTRACT

A processor for vacuum distillation of whole tires including; an insulated housing having a door on one end, and rails on a lower surface of the housing to support a cart loaded with whole tires. A plurality of first heat tubes arranged around and spaced from a central radiant heat tube, the central radiant heat tube having an unsupported end adjacent the door such that whole tires loaded on the cart and through the door will pass over the central radiant heat tube such that the central radiant heat tube is located in a central opening of each tire on the cart.

16 Claims, 5 Drawing Sheets

US 8,038,848 B2

RECYCLING OF TIRES, RUBBER AND OTHER ORGANIC MATERIAL THROUGH VAPOR DISTILLATION

RELATED APPLICATIONS

This application claims priority under 35 USC 119 to provisional patent application 60/919791 for Tire recycling by vapor distillation filed Mar. 23, 2007

BACKGROUND OF THE INVENTION

There is a need for effective ways to dispose of waste products in an environmentally safe way. There is a particular need for technologies that will keep material including used tires out of landfills and for processes that will convert materials such as used tires and other waste material otherwise destined for the landfill into useful products or material.

U.S. Pat. No. 5,976,484 is one prior art patent that does show the use of tires as a resource. The tires are cut up and reduced by heat to products such as oil and semi-activated carbon. Prior art systems have been too elaborate and expensive to be commercially practical. In some cases, used tires are just burned for fuel in high energy need processes such as cement kilns. While this provides some value and does keep tires out of dumps and landfills it is still a low value use and requires significant scrubbing of the exhaust gases produced.

As can be seen there is a need for simple and inexpensive ways to reduce the flow of material to landfills. In particular there is a need for processes that will provide better uses for used tire waste and do this in an environmentally safe way.

SUMMARY OF THE INVENTION

According to the invention, a vacuum distillation process is used to reduce tire waste to useful products.

According to the invention, a method of recovering material from tires includes the steps of prepping the tires and weighing the tires to obtain a total tire weight. Then the process monitors the process of tire decomposition by monitoring weight or pressure in the processor.

The heating continues until the volatiles are driven off and then collected and condensed.

According to another aspect, the invention includes a processor for vacuum distillation of whole tires including;

an insulated housing having a door on one end, and rails on a lower surface of the housing to support a cart loaded with whole tires. A plurality of first heat tubes arranged around and spaced from a central radiant heat tube, the central radiant heat tube having an unsupported end adjacent the door such that whole tires loaded on the cart and through the door will pass over the central radiant heat tube such that the central radiant heat tube is located in a central opening of each tire on the cart.

These and other advantages of the present invention will become apparent from the detailed description of the invention.

DETAILED DESCRIPTION OF THE DEVICE

Figure 1:
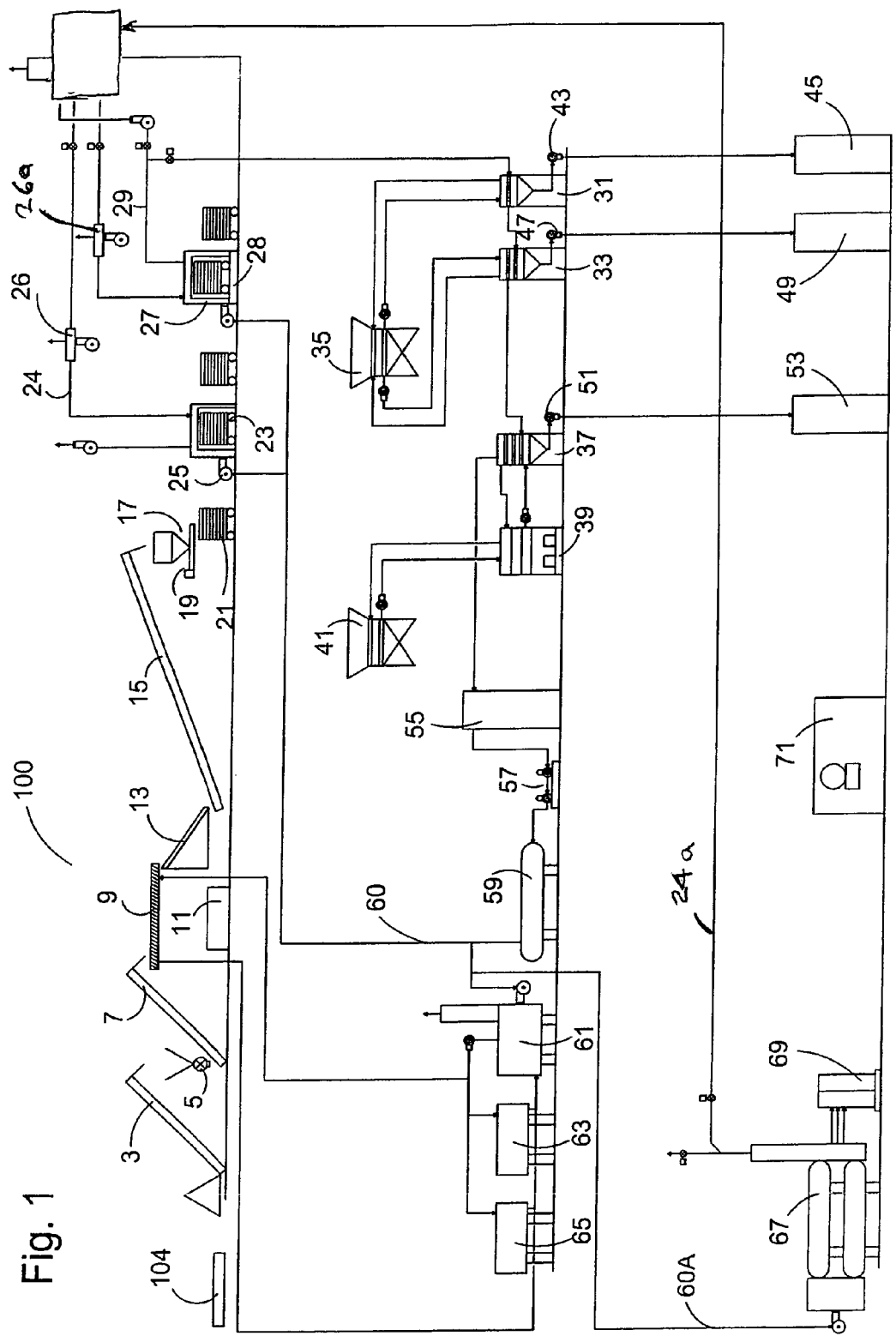
FIG. 1 shows an overview of the vacuum distillation method.

FIG. 1 shows an overview of the vacuum distillation of tires by batch process such as process 100. The process 100 begins with a scale 1 that weighs incoming material 104 such as used tire material. This weight data can be sent to controller 71 for use in processing later. Incoming material such as tires can be sent by conveyor 3 to a shredder 5 and then delivered by conveyor 7 to a raw material wash 9. Tires can include whole tires and off the road (OTR) tires.

Heater filter 11 can heat and filter wash water for use and reuse in washing dirt and sand from the material 104. Screen 13 allows for dewatering of the washed material and delivers the clean material to a conveyor 15 that carries clean feed material 104 to a loading hopper 17 that is weighed on scale 19 and delivered to process carts 21 that are loaded with the carcass of used tire material 104. A number of process carts 21 can be loaded into the pre-heater oven 23. Pre-heater oven 23 uses hot exhaust gases from generator 67 to begin to pre heat the tire material 104. Exhaust gas is supplied to the pre-heater through supply line 24. The flow of exhaust gases to pre-heat oven 23 can be controlled by regulator on heat exchanger 26 which in turn can be controlled by a controller 71 according to a target preheat temperature and according to the actual temperature conditions in the oven 23. Exhaust gases in line 24 and 24a will be at 800-1100 degrees F. and the target pre-heat temperature in pre-heat oven 23 is in the range of 220-300 degrees F. which is high enough to drive off all the water from the washed tire material 104 but well below the temperature range at which any volatile material would begin to come off tire material 104. In addition to exhaust gases from generator 67 fuel from tank 59 can be supplied through line 60 to heater 25. Once controller 71 receives a signal that the pre-heat temperature has been achieved within oven 23 carts 21 will be maintained at that temperature until, carts 21 can be released to the next step. In the main processor 27 the total weight of the carts 21 is known. The carts 21 loaded with materials 104 are weighed using scale 28 and the processor 27 is sealed shut. The materials 104 are then subjected to heat and vacuum distillation according to the process flow chart (FIG. 2) or a similar process. For example instead of weight it is known to monitor vacuum distillation based on time and or pressure readings in a processor which will vary depending on the material being processed.

The tire materials 104 are heated until desired temperatures and vacuum pressures are met to drive off desired volatiles. Initial heat for processor 27 can be provided by exhaust 24a from generator 67. The exhaust is an ideal starting atmosphere for the processor 27 because it is non-combustible. It is important that the atmosphere in processor 27 be devoid of oxygen as the operating conditions in the processor 27 include temperatures high enough for materials 104 to ignite. Heat can also be provided by burning gas from line 60 for example. In the processor 27, at relatively low temperatures in the 400-600 degrees Fahrenheit range, some volatiles in the form of gas will begin to be driven off. A specific target temperature can be set to drive off a known volatile gas and that temperature can be held until all of that material that is volatile at that temperature has been removed through line 29. Gases from line 29 can be supplied to first stage condenser 31. Progress can be monitored by using the scale 28 or other process monitor such as a pressure monitor which can be connected to a programmable controller 71. Desired target temperatures and weights or pressures can be calculated, programmed and stored using the programmable controller 71. The amount of a specific volatile can be known based on knowledge of the tires used and weights taken from scale 28, so the process can proceed until all or a desired percentage of the given volatile has been driven off as monitored by the controller 71. The volatile gas driven off can be pumped into a condenser 31 and desired portions of volatile material can then be condensed out of the gas stream and stored in tank 45. Cooling water for condenser 31 can be supplied by cooling tower 35. A volatile such as heavy oil can be condensed out of the gas stream from the processor 27, the remaining gas can be stripped off and sent to a further $2^{nd}$ stage condenser 33. The condensate heavy oil can be pumped by pump 43 to a storage tank 45. A similar separation process occurs again in condenser 33, a further condensate is condensed out at a slightly lower temperature than occurs in condenser 31. At the second condenser 33 a lighter organic is condensed out, in this case diesel fuel might be condensed out and pumped by pump 47 to a second storage tank 49.

The condensation process can be repeated at lower and lower temperatures of condensation to condense out any desired product from the original gas flow from processor 27. At a third stage condenser 37 an even lower temperature of condensation can be provided by chiller 39 and cooling tower 41 further products are pumped off by pump 51. Finally, remaining gas can be pumped by vacuum pump 57 through vacuum surge tank 55 and into stored in the tank 59 to fuel the process. The processor 27 can be controlled to yield different products of vacuum distillation depending upon market demand using programmable controller 71. Once a desired amount of the organics are driven off from the original tire material 104, what remains is steel and carbon char. Depending upon the final heat obtained in the processor 27 will determine the grade of carbon char with some trapped organics remaining.

The processor 27 is capable of driving off all contaminants and leaving semi-activated carbon as the final solid. As a practical matter it may be desirable to remove the carbon char from the processor 27 after a lower temperature is achieved and use a separate processor to take it to semi-activated carbon. The processor is a closed system and does not discharge any products to the atmosphere. Char that is structurally sound will come from running the processor 27 at a low temperature leaving more of the tightly bonded hydrocarbons. As the final temperature in the process rises, more hydrocarbon volatiles are driven off leaving a weaker char. The condensers 31 and 33 can use flowing water from cooling tower 35 as a coolant to condense out the volatiles.

Gas from tank 59 can flow through line 60 A to power the generator 67 that can provide electricity to power the operation. While the generator 67 uses some fuel, the process 100 will generate an excess of fuels and hydrocarbon products stored in tanks 45, 49, 53 and 59. Fuel from tank 59 can also power a gas fired boiler 61 that can heat water in tanks 63 and 65 for a building (not shown) and for manufacturing operations such as the washer 9. The fuel will also be used for the pre-heat process 23 and processor oven 27.

Figure 2:
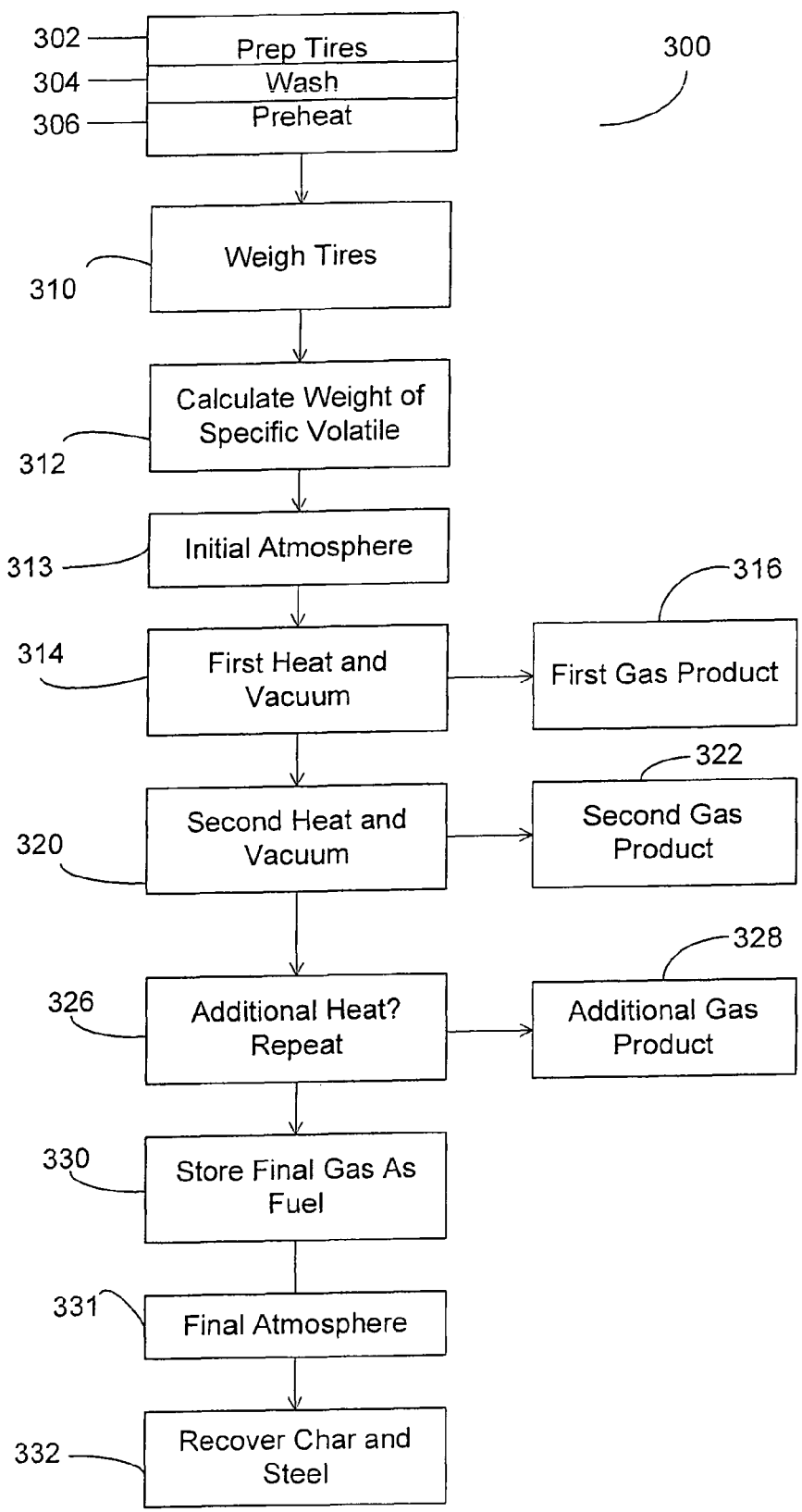
FIG. 2 shows a flow chart for the vacuum distillation method.

FIG. 2 shows a flow chart of the steps that can take place in the processor programmable controller 71. The process 300 includes first the step of prepping 302 the tire material 104. Prepping 302 might include collecting and culling the tires to pull out those that might be re-treaded, prepping 302 might also include removing the metal bead from the tire material 104, shredding in shredder 5. Prepping can include washing 304 the tires 104 to remove dirt in raw material washer 9, it can also include pre-heating 306 the tire material 104 to a temperature higher than ambient but lower than might begin vaporization of any volatile, other than water, to minimize the time in processor 27. Preheat temperature might take the tire material 104 to a temperature in the range of 250-350 degrees Fahrenheit under atmospheric pressure for example, pre-heating the tire material 104 and driving off any moisture. Preparing 302 might also include the step of shredding the tire material 104 in shredder 5 into smaller pieces again to facilitate the tire material 104 reaching a uniform target temperature as quickly as possible within the processor 27. Preparation might also include washing whole OTR tires and staging them on process carts 21.

Once the tire material 104 is prepped, the carts 21 are rolled into the processor 27 and the tire material 104 is weighed 310 using scale 28 shown in FIG. 1. The scale 28 is a large floor type scale capable of tracking the total weight of the carts 21. The total weigh of tire material 104 is the total weight measured less that of the carts 21 which is known.

Based on the weight of tire material 104, a weight can be calculated for a specific volatile to be removed. For example, there may be a customer wishing to purchase all of the diesel fuel that can be produced. So the weight of diesel that will come from the tire material 104 can be calculated 312. The process programmable control 71 can then flood processor 27 with an initial atmosphere 313 of carbon dioxide from generator 67 and set 314 the desired temperature and vacuum to optimize removal of diesel fuel from the tire material 104 and the process control 71 can monitor the process. The first gas can be vacuumed off to condenser 31 shown in FIG. 1 to be condensed and stored in tank 45. Then a second heat can be set 320 to match a second desired target temperature higher than the first, the second target temperature might be set to drive off a second gas product 322 such as #1 oil. Additional temperature targets can be set 326 to drive off additional products, the process 300 can continue until the temperature targets get high enough that all that is left is semi-activated carbon and other inorganic material originally in the material 104. At each new temperature target the initial weight can be taken and a final desired target weight can be calculated or pressure can be used to monitor process progress and the temperature set is maintained until enough gas is taken off and the new lower target weight is achieved.

Finally, after the highest desired temperature is achieved the temperature in the processor 27 can be allowed to return to a lower temperature such that the carts 21 can be removed to recover 332 the resulting carbon char. The quality of the carbon char will depend upon the highest temperature set to recover volatiles. Cooling in the processor can be accelerated by flooding the processor 27 with cooled generator exhaust gas as a final atmosphere 331. For example, the processor 27 might reach a high temperature of 800-1200 degrees F. At those temperatures the processor 27 can not be opened without extreme fire hazard. Cooling from 1200 degrees could take a long dwell time, but the processor 27 can be flooded with cooled exhaust gas from generator 67, these gases might be cooled to 250-350 degrees prior to circulation into the processor 27. Once cooled below combustion temperatures, the processor 27 can be opened and carbon char can be recovered from carts 21.

The processor 27 when operated as shown in FIG. 2 has almost no atmospheric emissions except for carbon dioxide from the fuel to provide heat, yielding a very clean method of handling tire waste and other waste material.

Figure 3:
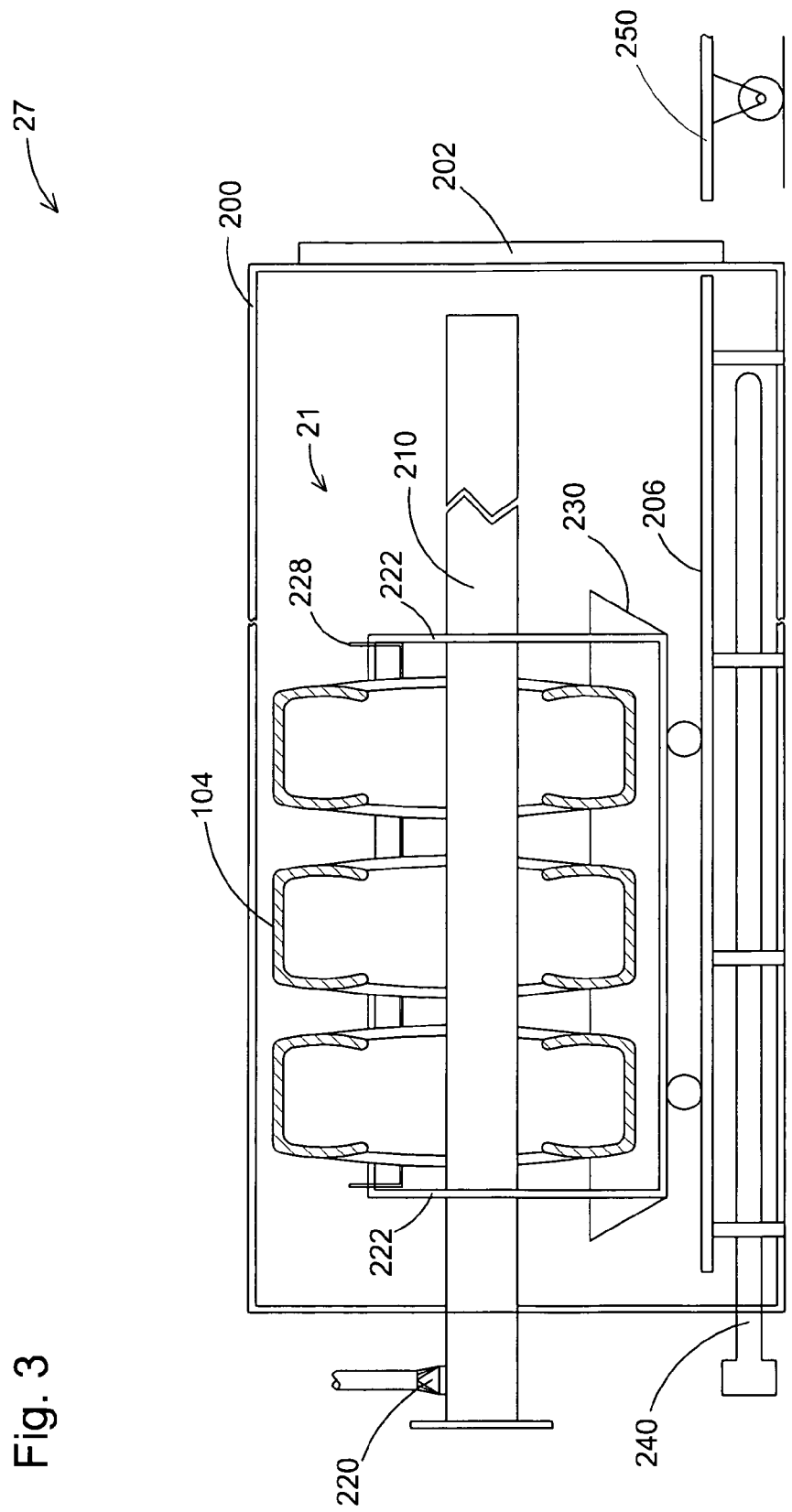
FIG. 3 shows a cross section view of the processor.
Figure 4:
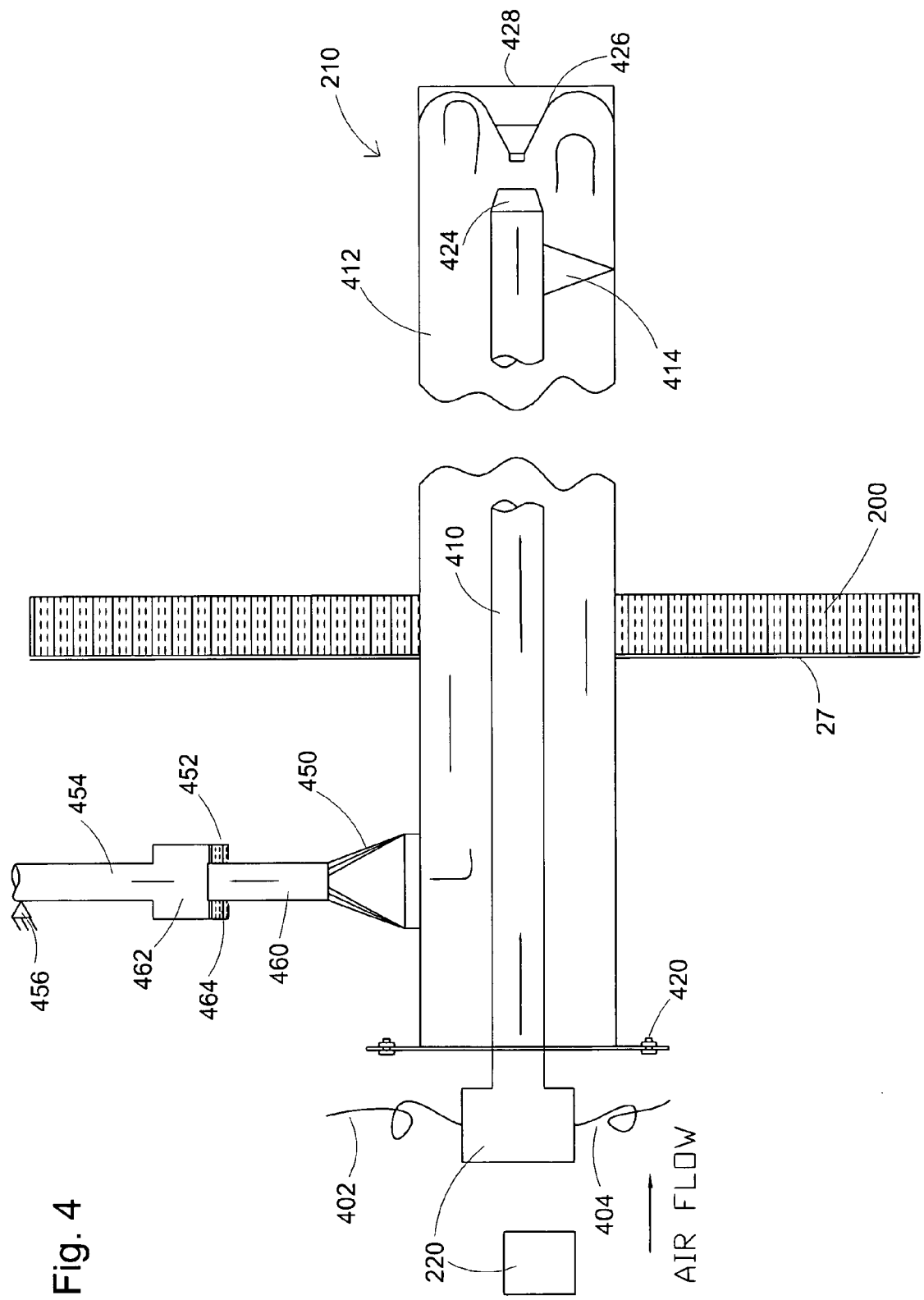
FIG. 4 shows details of the heating portion of the processor.

FIG. 3 shows details of the processor 27 which includes and insulated outer housing 200 and a sealable door 202. Tires 104, which can include large off road tires are placed on wheeled carts 21 and rolled through an opening such as door 202 onto tracks or rails 206. The tires 104 are positioned vertically such that a heat tube 210 will be positioned in the center of the tires 104. A burner 220 on the outside of the processor ignites gas which burns as it travels down the center of the heat tube 210. Details of the heat tube 210 and burner 220 are shown in FIG. 4. The cart 21 includes uprights 222. In loading the processor the tires 104 are first placed over a bar 228 that can be lifted by lift device such as fork lift (not shown) or crane and placed on the uprights 222. These large Off The Road (OTR) tires 104 can be too heavy to be handled manually, some weighing hundreds of pounds. Other chipped and whole tires can be placed on carts 21 and processed in a similar manner. Once on the cart 21 the tires 104 can be rolled along a track on the lower surface of the processor 27 such as rails 206 into the processor 27. A fixture loading cart 250 with rails aligned with rails 206 can be used to transfer the cart 21 in and out of the processor 27. In the processor 27 the organic material will be driven from the tires 104 and the steel bands inside the tires 104 will remain hanging on bar 228 for easy clean up. Some carbon char will remain on the steel bands while the rest will fall into basket 230 formed at the bottom of the cart 21. The center heat tube 210 provides heat to the center portion of the tires that accelerates there distillation. Additional heat tubes 240 heat the outside of the tires 104. A plurality of heat tubes 240 can surround the outside of the tires 104, experience has shown that 3 or 4 are sufficient to distribute the heat.

FIG. 4 shows details of the burner 220 and center heat tube 210. The burner 220 receives gas through a flexible looped gas line 402. It has been found that for the scale 28 to work properly all the connections to the processor 27 must be flexible and allow movement in all direction. The flexible looped gas line 402 provides one such flexible connection. Looped electrical connections 404 can also be used to provide enough wire to compensate for movement of the processor 27 in any direction. A removable burner tube 410 is located down the center of the center radiant heat tube 210 which includes an outer shell 412 which transfers radiant heat from the burner tube 410 to the processor 27 without allowing open flames in the interior of the processor 27. An expansion guide 414 supports the end of the burner tube 410 but allows for some movement of the burner tube 410 relative to the heat outer shell 412. Removing the bolts 420 allows the burner tube 410 to slide out of the shell 412 for service or replacement. The arrows in FIG. 4 show the direction of air flow through the burner 220 and center heat tube 210. Air is mixed with gas in the burner 220 and ignited. The mixture flows down through burn tube 410 and then through venture 424 and the flow of gas is reversed at air flow end plate 426 which has a curved shape to aid in flow reversal. The flow end plate 426 is mounted in an unsupported end 428 of the central radiant heat tube 210. The flow direction is changed 180 degrees and flow then travels in the shell between the tube 410 and the heat outer shell 412 where heat is transferred to the processor 27. Thus the radiant heat tube 210 contains a dual pass burner system that allows the cart 21 to easily roll thru the open door and into and out of the processor 27 without interference. Exhaust gas then exits the processor through flue 450 which is connected to an exhaust stack 454 by flue expansion joint 452. The exhaust stack 454 will include a fixed support 456 such as a connection to a building containing the processor 27 so then expansion joint 452 is required to allow the scale 28 to function properly. The expansion joint includes a first pipe 460 carrying gas into the joint 452, and enlarged pipe section 462 having a packing material that insulates and prevents exhaust leak and the joint then connects to a fixed exhaust stack 454 connected to a fixed structure 456 such as a building. As can be seen in FIG. 3 the heat radiating from the surface of heat outer shell 412 goes directly to the inside of the tires 104 which aids in rapid decomposition of the tires 104.

Figure 5:
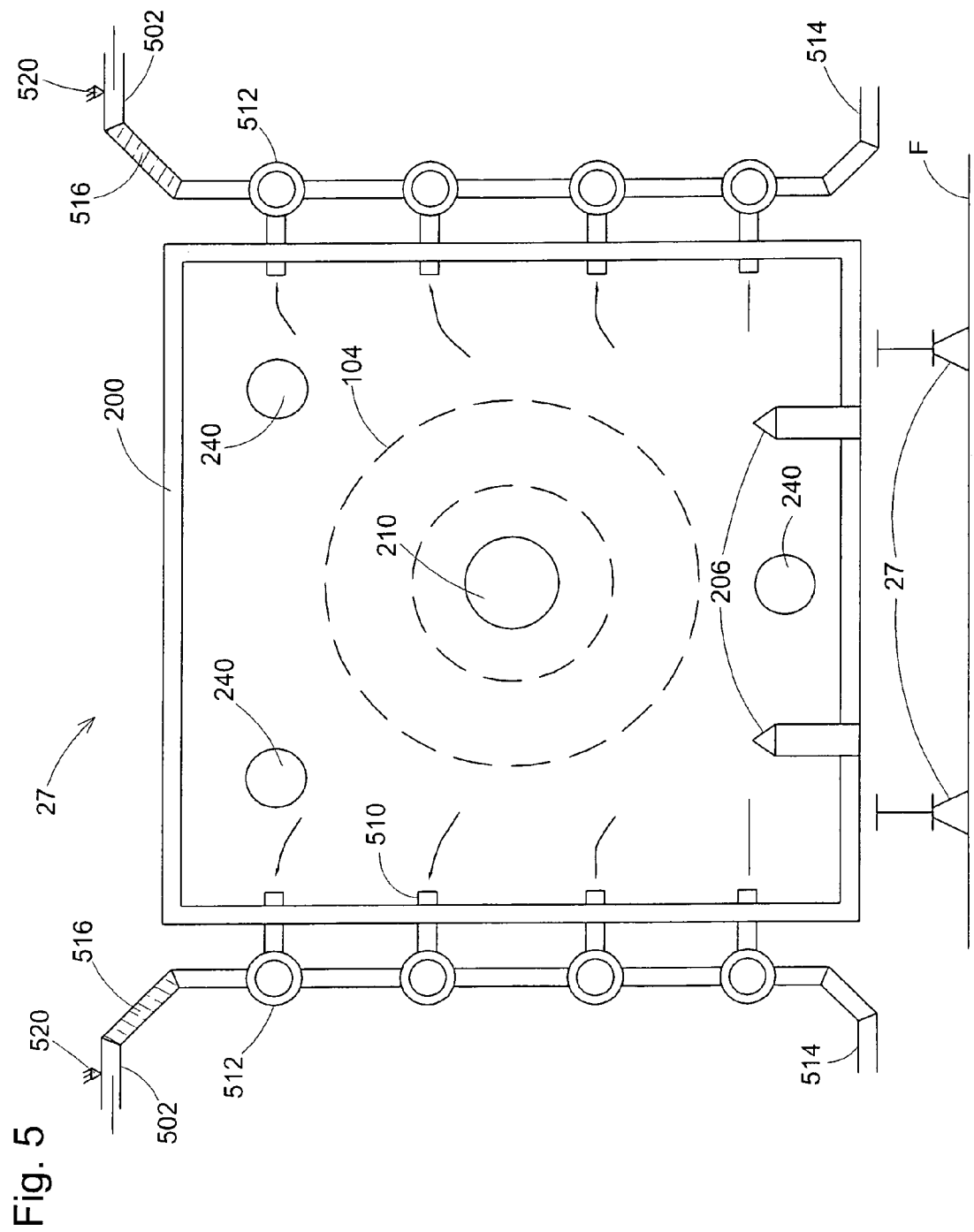
FIG. 5 shows details of the processor.

FIG. 5 shows an end view of the processor 27 with the door 202 removed. Arrows indicate a direction of flow as vacuum is applied through connections 502. Organic material in gas form from the tires 104 fills the processor 27 an is drawn out through outlets 510. The gas flows into cylindrical condenser tubes 512 that line the exterior of the processor 27. These cooling condenser tubes allow some of the gas to begin to cool and condense into liquid. Liquids will flow down through the condenser and exit at flexible oil pipe connections 514 while lighter gas that does not condense will be evacuated through upper flexible vacuum pipe connections 516. The connections 514, 516 might be braided cable for example and can be placed at an angel such as 45 degrees show, this allows for movement of the processor 27 in any direction relative to fixed supports such as a the floor 'F' and tube supports 520 for example. The processor 27 can be supported by any support such as a scale 27. Alternatively the processor might be used without the scale 27 or the scale 27 might be used to weigh the tires 104 at the start and end of the process. FIG. 5 also shows an end view of the center radiant heat tube 210 and the other heat tubes 240. The heat tubes 240 can be spaced around the exterior of the tire 104 shown in phantom lines and the tire centers are located over the central radiant tube 210. It has been found that an arrangement of three tubes 240 spaced around the tire 240 at approximately 120 degree spacing plus the center radiant tube 210 provides coverage of the tire 104 such that rapid and complete decomposition occurs.

Though modifications and changes may be suggested by those skilled in the art, it is the intention of the inventors to embody within the patent warranted hereon all changes and modifications covered by the attached claims.

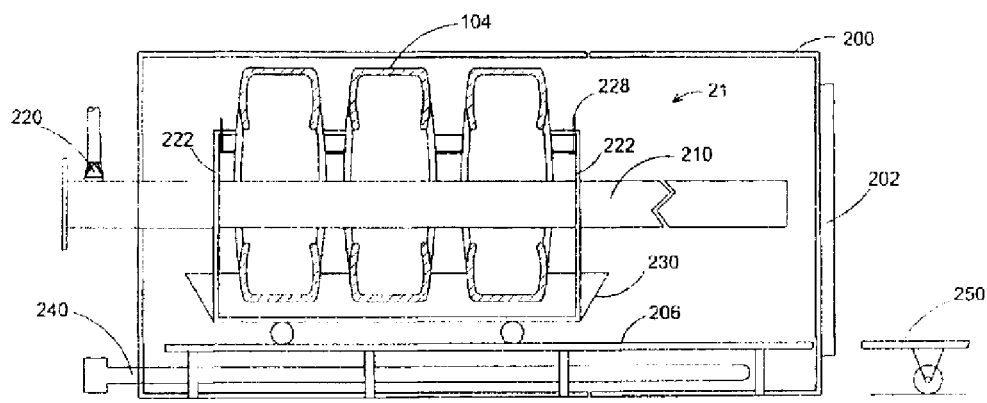

The invention claimed is:

1. A processor for vacuum distillation of whole tires including;
   an insulated housing having a door on one end,
   rails on a lower surface of said housing to support a cart loaded with whole tires,
   a plurality of first heat tubes arranged around and spaced from a central radiant heat tube, said radiant heat tube having an unsupported end adjacent said door such that whole tires loaded on said cart and through said door will pass over said central radiant heat tube such that said central radiant heat tube is located in a central opening of each tire on said cart.

2. The processor of claim 1 wherein said radiant heat tube includes an inner heat tube for carrying burning gases in a first direction toward said door and an outer shell for carrying said gases in an opposite direction away from said door.

3. The processor of claim 1 wherein said processor includes at least one vacuum source to draw gases from said housing.

4. The processor of claim 1 wherein said central radiant tube includes a burner mounted on an end of said central radiant tube and wherein gases from said burner flow down a center tube in said central radiant tube toward said door and then said gases reverse flow adjacent said door and flow back toward said burner.

5. The processor of claim 1 wherein said first heat tubes includes three heat tubes spaced around said central radiant tube at approximately 120 degree spacing.

6. The processor of claim 2 wherein said outer shell is connected to an exhaust flue and said exhaust flue includes a flexible joint, said flexible joint including a first exhaust pipe, a second exhaust pipe and an insulated coupling allowing relative movement between said first and second pipe without allowing leakage from said exhaust and further wherein said processor rests on a scale for weighing said processor before and during processing of said tires.

7. The processor of claim 2 wherein said processor includes at least one cylindrical condenser tube mounted on an exterior surface of said processor.

8. A processor for vacuum distillation of tires including;
an insulated housing having an opening on one end,
a cover over said opening,
a plurality of first heat tubes arranged around and spaced from a central radiant heat tube, said central radiant heat tube having an unsupported end adjacent said door and a supported end on a wall opposite said opening such that tires loaded through said opening will pass over said central radiant heat tube such that said central radiant heat tube is located in a central opening of each tire.

9. The processor of claim 8 wherein said radiant heat tube includes an inner heat tube for carrying heated gas in a first direction toward said opening and an outer shell for carrying said gases in an opposite direction away from said opening.

10. The processor of claim 9 wherein said central radiant tube includes a burner mounted on an end of said central radiant tube opposite said opening and wherein gases from said burner flow down a center tube in said central radiant tube toward said opening and then said gases reverse flow adjacent said opening and flow back toward said burner.

11. The processor of claim 10 wherein said outer shell is connected to an exhaust flue and said exhaust flue includes a flexible joint, said flexible joint including a first exhaust pipe, a second exhaust pipe and an insulated coupling allowing relative movement between said first and second pipe without allowing leakage from said exhaust and further wherein said processor rests on a scale for weighing said processor before and after processing of said tires.

12. The processor of claim 11 wherein said processor includes at least one vacuum source to draw gases from said housing and wherein said processor includes at least one condenser having a cylindrical tube mounted on an exterior surface of said processor such that liquids condensed from said tire processing run out the bottom of the condenser and lighter gases exit from a top portion of said condenser.

13. A processor for vacuum distillation of tires including;
an insulated housing having an opening on one end,
a door over said opening,
a heater,
a scale supporting said processor,
wherein said heater is connected to an exhaust flue and said exhaust flue includes a flexible joint, said flexible joint including a first exhaust pipe, a second exhaust pipe and an insulated coupling allowing relative movement between said first and second pipe without allowing leakage from said exhaust and further wherein said processor rests on a scale for weighing said processor before and during processing of said tires.

14. The processor of claim 13 wherein said heater includes a plurality of first heat tubes arranged around and spaced from a central radiant heat tube, said central radiant heat tube having an unsupported end adjacent said door and a supported end on a wall of said housing opposite said door such that tires loaded on said cart and through said door will pass over said central radiant heat tube such that said central radiant heat tube is located in a central opening of each tire on said cart.

15. The processor for vacuum distillation of claim 13 wherein; said radiant heat tube includes an inner heat tube for carrying burning gases in a first direction toward said door and an outer shell for carrying said gases in an opposite direction away from said door.

16. The processor of claim 13 wherein said processor includes at least one vacuum source to draw gases from said housing and wherein said processor includes at least one condenser having a cylindrical tube mounted on an exterior surface of said processor such that liquids condensed from said tire processing run out the bottom of the condenser and lighter gases exit from a top portion of said condenser.

* * * * *

UNITED STATES PATENT AND TRADEMARK OFFICE
CERTIFICATE OF CORRECTION

| | |
|---|---|
| PATENT NO. | : 8,038,848 B2 |
| APPLICATION NO. | : 12/077795 |
| DATED | : October 18, 2011 |
| INVENTOR(S) | : Buhr |

It is certified that error appears in the above-identified patent and that said Letters Patent is hereby corrected as shown below:

Delete "Bohr" from Item (12) & (76) and insert "Buhr" in Item (12) & (76) as shown on the new title page attached.

Signed and Sealed this
Seventh Day of February, 2012

David J. Kappos
*Director of the United States Patent and Trademark Office*

(12) United States Patent
Buhr

(10) Patent No.: US 8,038,848 B2
(45) Date of Patent: Oct. 18, 2011

(54) RECYCLING OF TIRES, RUBBER AND OTHER ORGANIC MATERIAL THROUGH VAPOR DISTILLATION

(76) Inventor: Harvey Buhr, Bonnots Mill, MO (US)

( * ) Notice: Subject to any disclaimer, the term of this patent is extended or adjusted under 35 U.S.C. 154(b) by 828 days.

(21) Appl. No.: 12/077,795

(22) Filed: Mar. 21, 2008

(65) Prior Publication Data
US 2008/0230365 A1 Sep. 25, 2008

Related U.S. Application Data
(60) Provisional application No. 60/919,791, filed on Mar. 23, 2007.

(51) Int. Cl.
C10B 1/00 (2006.01)
B01D 3/00 (2006.01)

(52) U.S. Cl. ........ 202/105; 202/133; 202/117; 202/262; 422/610; 422/643; 422/307

(58) Field of Classification Search .......... 202/96, 202/97, 117, 133, 211, 237, 242, 262, 270, 202/105; 422/610, 643, 307
See application file for complete search history.

(56) References Cited

U.S. PATENT DOCUMENTS

| | | | |
|---|---|---|---|
| 4,050,991 A | 9/1977 | Kautz, Jr. | |
| 4,402,791 A | 9/1983 | Brewer | |
| 4,648,328 A | 3/1987 | Keough | |
| 5,198,018 A * | 3/1993 | Agarwal | 75/401 |
| 5,366,595 A * | 11/1994 | Padgett et al. | 201/19 |
| 5,449,438 A | 9/1995 | Jagau et al. | |
| 5,720,232 A | 2/1998 | Meador | |
| 5,783,046 A * | 7/1998 | Flanigan | 201/25 |
| 7,037,410 B2 * | 5/2006 | Flanigan | 202/81 |
| 7,329,329 B2 | 2/2008 | Masemore et al. | |
| 7,375,255 B2 * | 5/2008 | Lee | 585/241 |
| 7,416,641 B2 | 8/2008 | Denison | |
| 2006/0163053 A1 | 7/2006 | Ershag | |
| 2008/0017496 A1 * | 1/2008 | Thompson | 201/25 |
| 2008/0257709 A1 * | 10/2008 | Dimitrov et al. | 201/25 |
| 2009/0211892 A1 | 8/2009 | Cunningham et al. | |

FOREIGN PATENT DOCUMENTS

| | | |
|---|---|---|
| EP | 0446930 B1 | 3/1991 |
| EP | 0 851 019 B1 | 12/1997 |
| EP | 1347238 * | 9/2003 |
| GB | 2303859 * | 3/1997 |
| GB | 2303859 | 5/1997 |

* cited by examiner

Primary Examiner — Nina Bhat
(74) Attorney, Agent, or Firm — Mark Manley

(57) ABSTRACT

A processor for vacuum distillation of whole tires including; an insulated housing having a door on one end, and rails on a lower surface of the housing to support a cart loaded with whole tires. A plurality of first heat tubes arranged around and spaced from a central radiant heat tube, the central radiant heat tube having an unsupported end adjacent the door such that whole tires loaded on the cart and through the door will pass over the central radiant heat tube such that the central radiant heat tube is located in a central opening of each tire on the cart.

16 Claims, 5 Drawing Sheets